(12) United States Patent
Nowottnick et al.

(10) Patent No.: US 7,492,249 B2
(45) Date of Patent: Feb. 17, 2009

(54) ELECTRONIC COMMUNICATION SYSTEM

(75) Inventors: Jürgen Nowottnick, Hamburg (DE); Thomas Giesler, Hamburg (DE)

(73) Assignee: NXP B.V., Eindhoven (NL)

( * ) Notice: Subject to any disclaimer, the term of this patent is extended or adjusted under 35 U.S.C. 154(b) by 697 days.

(21) Appl. No.: 10/543,069

(22) PCT Filed: Jan. 12, 2004

(86) PCT No.: PCT/IB2004/000101

§ 371 (c)(1),
(2), (4) Date: Jul. 22, 2005

(87) PCT Pub. No.: WO2004/065144

PCT Pub. Date: Aug. 5, 2004

(65) Prior Publication Data

US 2006/0234775 A1    Oct. 19, 2006

(30) Foreign Application Priority Data

Jan. 22, 2003    (EP) .................................. 03100125

(51) Int. Cl.
*B60C 23/02*    (2006.01)
*B60Q 1/00*    (2006.01)
*G08B 21/00*    (2006.01)

(52) U.S. Cl. ........................ 340/442; 340/445; 340/448; 340/449; 340/539.24; 73/146.5

(58) Field of Classification Search ................ 340/442, 340/443, 446, 447, 448, 449, 10.1, 539.22, 340/539.24, 445; 73/146.5; 702/104
See application file for complete search history.

(56) References Cited

U.S. PATENT DOCUMENTS

| | | | | |
|---|---|---|---|---|
| 5,061,917 A | * | 10/1991 | Higgs et al. ............. | 340/539.22 |
| 5,335,541 A | * | 8/1994 | Sharpe ...................... | 73/146.5 |
| 6,775,632 B1 | * | 8/2004 | Pollack et al. ............. | 702/104 |
| 6,922,134 B1 | * | 7/2005 | Yones ...................... | 340/10.51 |

\* cited by examiner

*Primary Examiner*—Davetta W Goins
(74) *Attorney, Agent, or Firm*—Peter Zawilski

(57) ABSTRACT

In order to develop an electronic communication system (100; 100'), designed for a progressive movement means, having at least one base station (10) and having at least one carrier station (60) such that the possible uses of this communication system (100; 100') can also be extended to other important areas of use of a progressive movement means, it is proposed that the carrier station (60) be designed as in each case at least one sensor unit, which is assigned to at least one wheel or tire (90) of the progressive movement means and—which is designed to detect and/or determine at least one characteristic parameter of the wheel or tire (90), such as for example the air pressure and/or the temperature and/or the wear of the wheel or tire (90).

10 Claims, 4 Drawing Sheets

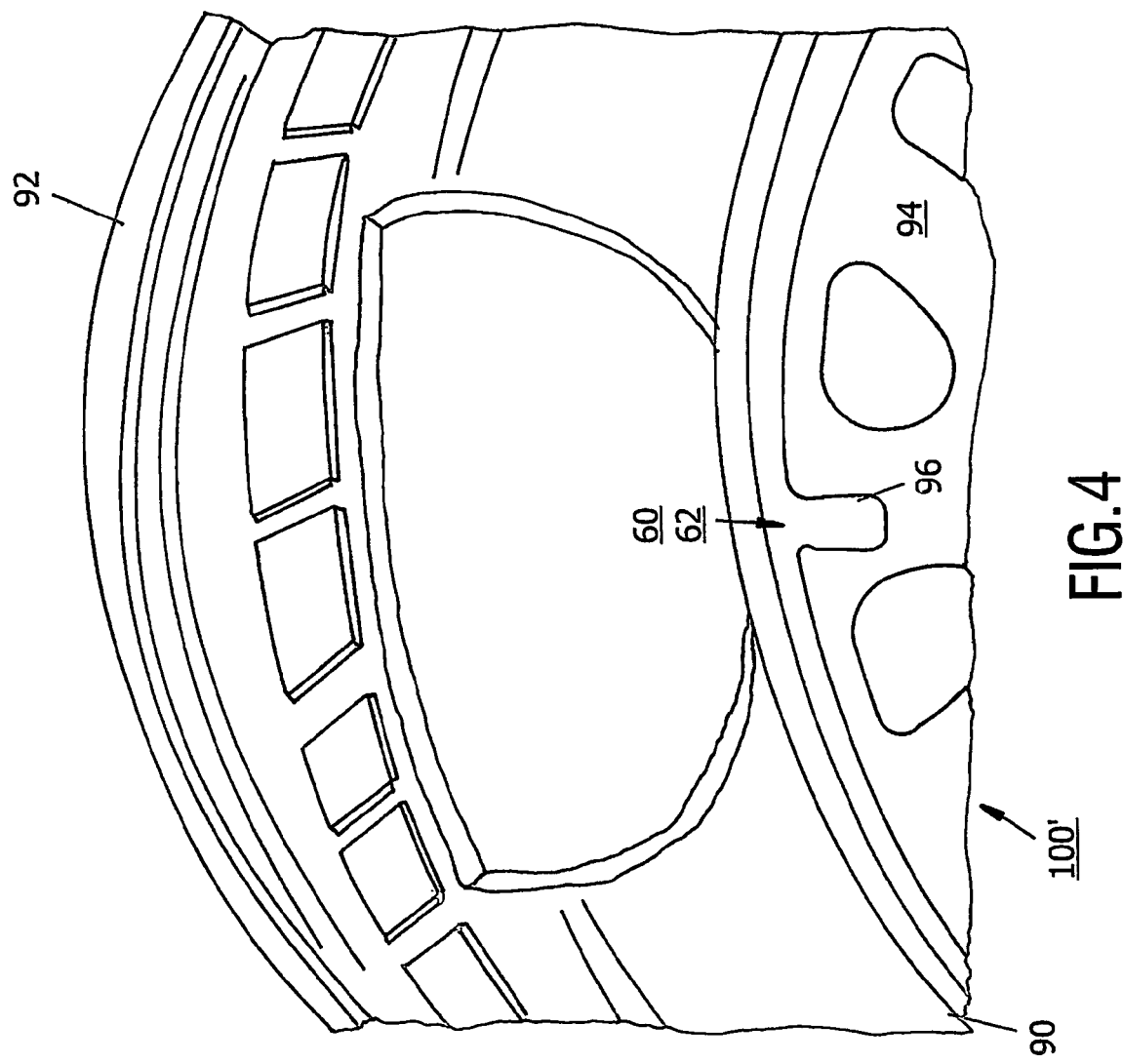

ELECTRONIC COMMUNICATION SYSTEM

The present invention relates in general to the technical field of electronic circuits and the design of the physical layout thereof.

Specifically, the present invention relates to an electronic communication system for a progressive movement means as claimed in the precharacterizing clause of the main claim.

An electronic communication system of the type mentioned above is known from the document WO 00/15931 A1.

However, said communication system is limited in its application possibilities in that it is designed essentially for the keyless locking and opening of the doors of a progressive movement means. In conjunction therewith, the known subject matter according to the document WO 00/15931 A1 allows merely an exchange of data and signals between a base station and a data carrier that is designed, for example, in the form of a card.

Since, however, nowadays increased demands are being placed in the automobile sector on the function and the reliability of certain components, the proposed solution according to the document WO 00/15931 A1 no longer appears to be entirely satisfactory.

Starting from the above-described disadvantages and shortcomings and in acknowledgement of the outlined prior art, it is an object of the present invention to develop an electronic communication system of the type mentioned above such that the possible uses of this communication system can also be extended to other important areas of use of a progressive movement means.

This object is achieved by an electronic communication system having the features given in claim 1. Advantageous refinements and expedient developments of the present invention are characterized in the subclaims.

According to the teaching of the present invention, the communication between the base station and the sensor unit that is assigned to at least one wheel or tire of the progressive movement means is effected capacitively; the sensor unit in this case serves to detect and/or determine at least one characteristic parameter of the wheel or tire, such as for example the air pressure and/or the temperature and/or the wear of the wheel or tire. The detected or determined data are then capacitively exchanged with the base station using signal technology.

Figure 1:
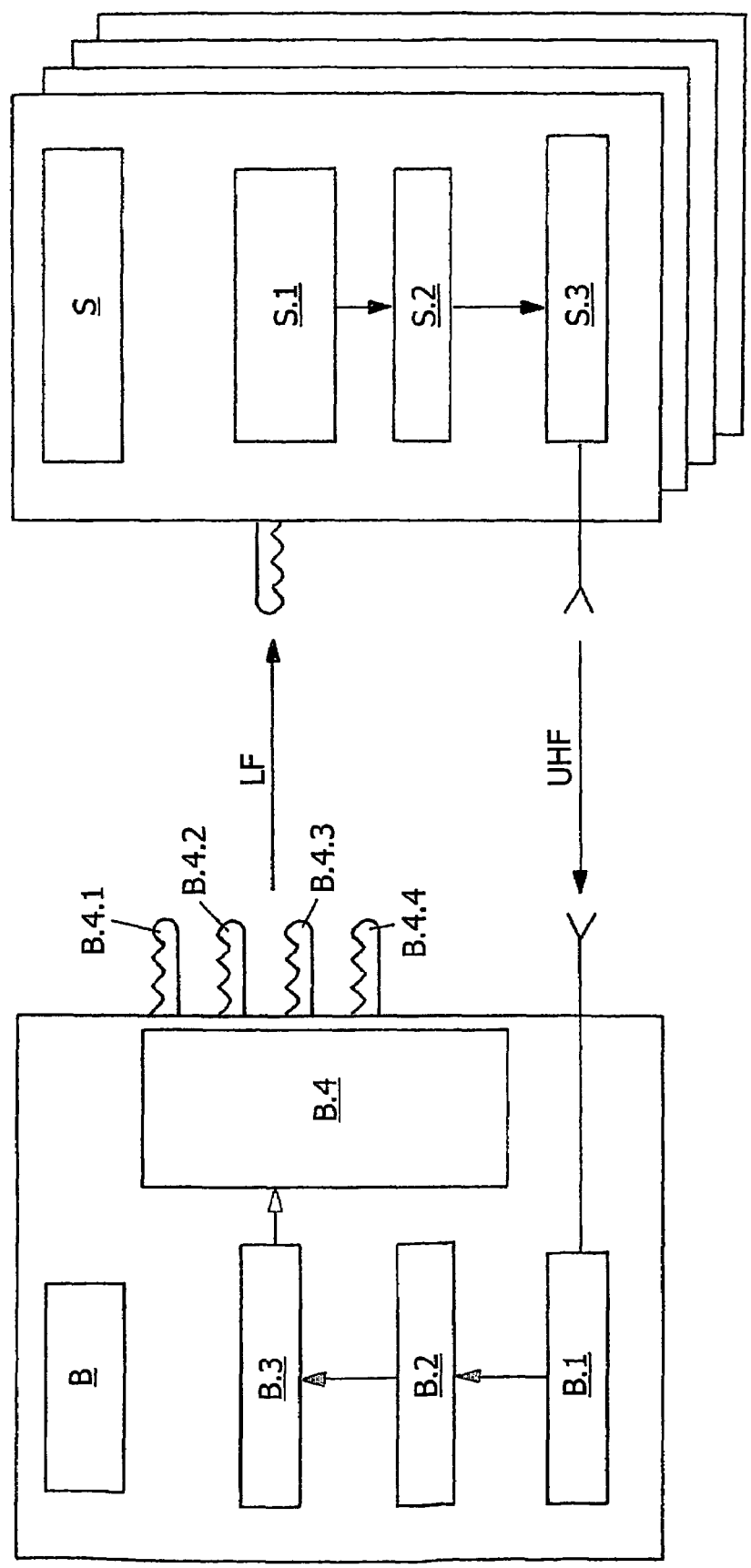

The present invention hereby differs substantially from conventional arrangements in which, in order to effect communication between the base station and the associated sensors located on the wheel or in the tire, a configuration is usually used which is based on an inductive principle and is shown in FIG. 1, which is to be ascribed to the prior art:

In the case of this inductive coupling according to the prior art, what is referred to as the base station B (having an U[ltra]H[igh]F[requency] receiver B.1, a microcontroller B.2 and a L[ow]F[requency] transmitter B.3) with the respective inductive antennas B.4.1, B.4.2, B.4.3 and B.4.4 that are designed in the form of coils (having an associated multiplexer or having four associated transmitters B.4) initiates a communication sequence for the deliberate selective activation (what is referred to as the "inductive wake-up 1, 2, 3, 4") of the respective sensor circuit S (having an active L[ow]F[requency] receiver S.1, a microcontroller S.2 and an U[ltra]H[igh]F[requency] transmitter S.3 for the "UHF response" to the U[ltra]H[igh]F[requency] receiver B.1); the activation of the sensor electronics is hereby effected over at least one inductive channel.

However, on account of the system, this type of inductive data transmission holds some problems and risks in that the magnetic field between the transmitting antenna and the receiving antenna is screened in unfavorable orientations by the rim of the wheel or tire; although such an undesirable screening can in some circumstances be prevented using a number of coils on the base station and/or on the sensor, a technical measure such as this is naturally cost-intensive.

Furthermore, in inductive coupling it has been proven that the influence of metal is problematic in that the metal in the vicinity of the inductive communication system leads to an influencing of the field characteristic and thus possibly to positions at which communication is no longer possible. In this connection, the metal parts located in the vicinity of the transmitting coils and the metal parts located in the vicinity of the receiving coils also lead to a detuning of the resonant circuit, which in turn brings about a reduction in the radiated field and also a decrease in the voltage on the resonant circuit at the receiver side.

Finally, in the case of the inductive coupling of base station and sensor unit(s), the magnetic field may be damped by eddy currents on account of the increasing use of conductive tire rubber, as a result of which communication problems may likewise arise in some circumstances.

By a capacitive coupling principle now being proposed according to the invention for communication between base station and sensor unit(s), compared with the previously known inductive coupling principle a number of advantages can be achieved:

Since inductive coupling is dispensed with, a large number of coils both on the base station and on the sensor electronics can be saved, as a result of which a large reduction in costs is achieved. Besides dispensing with (ferrite) coils, capacitive-based coupling also makes it possible for additional savings to be made, both in terms of the electronics of the base station and in terms of the electronics of the sensors located on the wheel or in the tire, as a result of which the costs can be further reduced.

In the present invention, it is also advantageous that cost-effective implementation possibilities for the electrodes makes the use thereof in mass production beneficial; in principle, the mechanical arrangement of the transmitter electrode (=coupling electrode of the base station) and of the receiver electrode (=coupling electrode of the sensor unit) can in this case be selected at will.

A practical implementation of the electrode arrangement in simple mechanical configurations is also possible, where the capacitive coupling electrodes can be mechanically matched, in a very simple manner, to the conditions of the respective vehicle platform, and can also be designed to be much more stable in mechanical terms than the mechanically and thermally sensitive (ferrite) coils that are necessary for inductive communication.

The person skilled in the art in the field of communication electronics for progressive movement means, for example an electrical engineer with extensive knowledge in the field of motor vehicle electronics, with reference to the present invention will be able to appreciate that the communication conditions are no longer dependent on the position—as they were in the case of inductive solutions—since the coupling capacitance is approximately constant even during the rotation of the wheel or tire. This property allows reliable communication even at high speeds of the progressive movement means of more than 200 kilometers per hour.

The last-mentioned aspect also not least adds to the huge gain in active reliability and also passive reliability, which is made possible by the present invention, compared with inductive couplings; this extra reliability is already very highly valued in relation to wheels and tires of a progressive movement means; however, a burst wheel or tire at high speed can, for example, lead to traffic accidents with serious injuries and/or fatal consequences.

According to a particularly advantageous refinement of the present invention, the carrier station, in particular the coupling electrode of the carrier station, can be spatially assigned to the valve of the wheel or tire of the progressive movement means and/or be electrically insulated from the rim of the wheel or tire of the progressive movement means; accordingly, the coupling electrode of the sensor unit can be located on the wheel or tire.

Such a refinement is useful, for example, in the case of framework conditions in which the steel belt of modern tires is partially replaced by electrically non-conductive reinforcements and/or is not closed, so that such a steel belt can in some circumstances not always be used as an "auxiliary electrode".

For practical reasons (for example simple mounting and effective servicing) and/or for reasons of cost, too, it may prove to be advantageous for the coupling electrode (what is referred to as the "receiver electrode") and the carrier station (what is referred to as the sensor unit or "tag") where possible to be combined in a single module; in other words, this means that the carrier station and the coupling electrode can be designed as a single component and/or as a one-piece module.

In order, in this connection, to take other considerations and laboratory studies into account, a connection or fusion of the carrier station and/or of the coupling electrode to the valve of the wheel or tire may prove to be expedient, that is to say that the carrier station and/or the coupling electrode may be mechanically integrated in the valve body of the wheel or tire, so that the valve, the coupling electrode and possibly also the carrier station (=the sensor unit) form a single component.

The preferred refinements given above, in relation to which the prior art contains a number of constructive indications relating to the connection of antennas for tire sensor circuits to the valve body of the tire, for instance from the document DE 1 048 195
(control member for monitoring the tire pressure can be fitted to the valve, connect a contact to the rim and be capacitively coupled to corresponding electrodes on the vehicle body), from the document U.S. Pat. No. 3,249,916
(valve shaft comprises pressure indicator), from the document JP 11-180117
(assembly combined with the tire valve for monitoring the tire pressure, where the valve shaft also bears a coil-shaped antenna which is screwed onto the outside of the valve shaft; the assembly comprises a pressure sensor, a signal processing circuit and a battery) or from the document JP 2000-052726
(assembly combined with the tire valve for monitoring the tire pressure, where the valve shaft also serves as antenna; the assembly comprises a microprocessor and a battery), have a number of advantages, for instance, among other things, the combining of the coupling electrode (what is referred to as the "receiver electrode") and the carrier station (what is referred to as the sensor unit or "tag") in a single module, which makes mounting and servicing considerably easier.

Furthermore, simple mechanical integration of the coupling electrode into the existing valve is also possible, where the proposed refinements can be used both with steel breaker tires and with metal-free tires. Possibilities for making the electrodes in a cost-effective manner make the method beneficial for use in mass production.

According to embodiments of the present electronic communication system that are essential to the invention, there may be provided a bidirectional capacitive connection with bidirectional capacitive data transmission or a unidirectional capacitive connection with U[ltra]H[igh] F[requency] response.

The present invention, which incorporates both at least one base station of the type mentioned above and at least one sensor unit of the type mentioned above, can be used advantageously in progressive movement means, in particular in motor vehicles, in which sensors are used which are located in the wheels or tires. In order to achieve the necessary service life of the battery, these sensors carry out measurements only periodically and are assigned to a specific wheel or tire on the vehicle side.

For this, the sensors are selectively addressed or woken up in a suitable manner (what is referred to as the "wake-up"). For this purpose, the base station initiates a communication sequence for the deliberate, selective activation of the respective sensor circuit, where the activation of the sensor electronics is effected according to the invention over at least one capacitive transmission channel.

Typical sensors for which the present arrangement can advantageously be used are, for example, wheel pressure sensors or tire pressure sensors, wheel temperature sensors or tire temperature sensors, or wheel wear sensors or tire wear sensors;

the present invention also relates to the use of at least one capacitive coupling for data communication between at least one base station and at least one wheel or tire.

Now that the advantages of an electronic communication system on a capacitive basis have been explained above, at this point it should be pointed out that—in addition to the document WO 00/15931 A1 discussed above—the document WO 96/36134 A1 also discloses a wireless system that comprises a transmitter and a receiver which, however, are coupled through a user and through the ground potential of a room. The transmitter generates low-frequency signals of low power, which flow by capacitive coupling as displacement currents through the body of the user. The distributed ground potential of the room acts as return path for the current.

Furthermore, it should be mentioned that the document EP 0 843 425 A2 discloses an electronic communication device which uses the human body as a transmission medium. This conventional communication device is used to encrypt and transmit data from a transmitter, which may preferably be designed as a card, to a receiver, which is preferably contained in a base station.

The transmitter according to the document EP 0 843 425 A2 comprises a generator for generating an electric field, a data encryption device, which becomes active by modulation of the electric field, and electrodes, in order to couple the electric field through the human body. The receiver according to the document EP 0 843 425 A2 comprises electrodes which are in physical contact with or in close proximity to part of the human body, in order to detect an electric field which is transmitted through the body.

A demodulator within the receiver extracts the data from the modulated electric field. It is also stated that a receiver electrode can be arranged in a metal door handle of a motor vehicle. The doors will be unlocked automatically when the holder of an authorized card, that is to say an authorized transmitter, touches the door handle with his hand. Touching of the door handle without pulling the latter for a certain period of time, for example fifteen seconds, brings about unlocking of all the doors.

As explained above, there are various possibilities for refining and developing the teaching of the present invention.

For this purpose, on the one hand, reference is made to the claims that are dependent on claim 1 and, on the other hand, the invention will be further described with reference to examples of embodiment shown in the drawings to which, however, the invention is not restricted.

Figure 2:
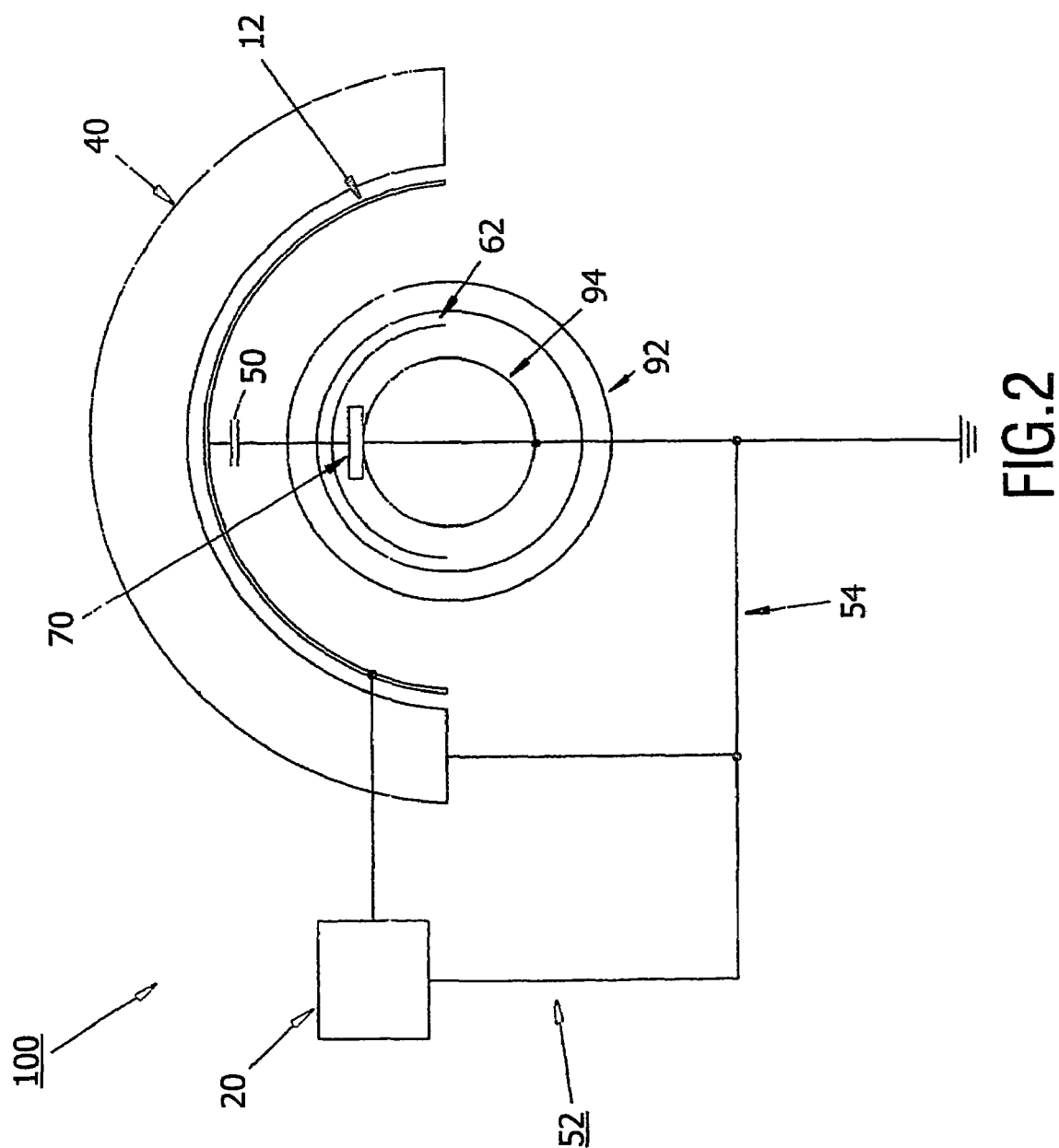
Figure 3:
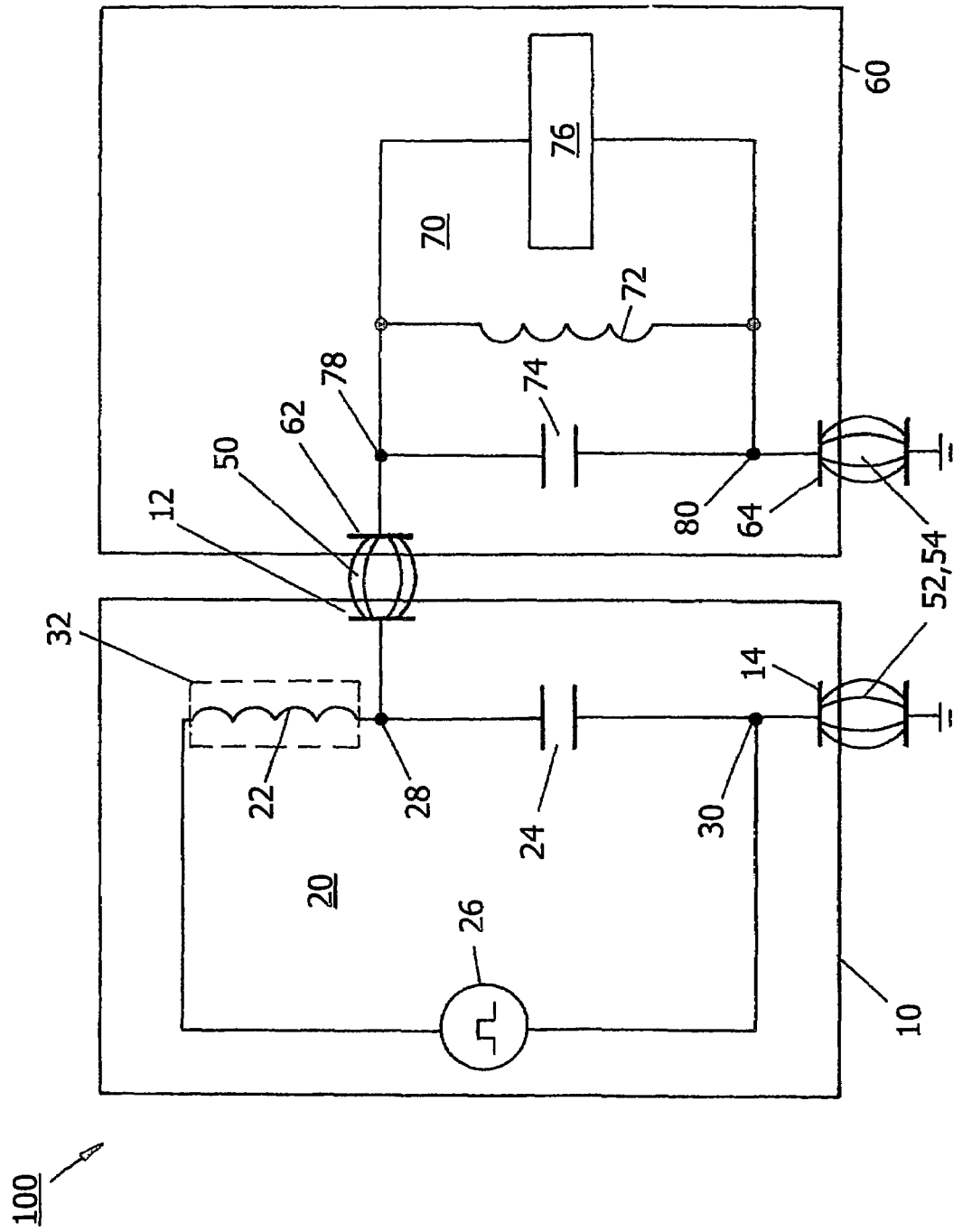

FIG. 1 schematically shows the communication principle, based on inductive coupling, between a base station and an associated sensor unit in the form of a sensor located in the tire or on the wheel, according to an example of embodiment of the prior art;

FIG. 2 schematically shows the electrical circuit diagram of the capacitive data transmission in the case of the communication principle, based on capacitive coupling, between a base station and an associated sensor unit in the form of a sensor located in the tire (cf. FIG. 3) or on the wheel (cf. FIG. 4), according to the present invention;

FIG. 3 schematically shows, in section, the communication principle of FIG. 2 according to a first mechanically designed example of embodiment of the present invention; and FIG. 4 shows, in a partially cut-away perspective view, the communication principle of FIG. 2 according to a second mechanically designed example of embodiment of the present invention.

Arrangements, elements or features that are identical or similar bear the same references in FIGS. 2 to 4.

As shown schematically in principle in FIG. 2 and also in FIG. 3 on the basis of a first mechanically designed example of embodiment and in FIG. 4 on the basis of a second mechanically designed example of embodiment, the basic idea of the present invention is to use, instead of inductive data transmission as shown in FIG. 1 according to the prior art, within the context of an electronic communication system 100 (cf. FIG. 3) or 100' (cf. FIG. 4), advantageously a capacitive transmission channel for data transmission between a base station 10 and a carrier station 60.

The carrier station is in this case designed, in a manner essential to the invention, as a sensor unit 60 assigned to a wheel or tire 90 of a motor vehicle, and serves to detect and determine characteristic parameters of the wheel or tire 90, namely the air pressure, the temperature and the wear of the wheel or tire 90.

For this purpose, a capacitive connection 50 is produced between a coupling electrode 12 of the base station 10, which is designed as transmitter electrode, and a coupling electrode 62 of the sensor unit 60, which is designed as receiver electrode; this capacitive connection for the transmission of data signals is shown symbolically in FIG. 2 by a coupling path 50 that is equivalent to a coupling capacitor and in FIG. 3 by a coupling capacitor 50 that symbolizes the coupling path and is formed by the coupling electrode 12 of the base station 10 and by the coupling electrode 62 of the sensor unit 60.

FIG. 2 then shows, in principle, the circuit design, used for the first example of embodiment according to FIG. 3 and also for the second example of embodiment according to FIG. 4, of the base station 10 and of the sensor unit 60, where this circuit is designed for unidirectional data transmission from the base station 10 to the sensor unit 60.

In this example of embodiment, the data signal processing circuit 20 assigned to the base station 10 comprises an inductance 22 that is optionally provided with at least one screen 32, a capacitance 24 and a driver circuit 26 in the form of a modulator; these elements 22, 24 and 26 are connected in series with one another. The coupling electrode 12 of the base station 10 is connected at the connection point 28 between the inductance 22 and the capacitance 24, and the ground electrode 14 of the base station 10 is connected at the connection point 30 between the capacitance 24 and the driver circuit 26.

In a comparable manner, the data signal processing circuit 70 assigned to the sensor unit 60 and in particular in this case to the rim 94 (cf. FIGS. 3 and 4) comprises a resonant circuit, which comprises an inductance 72 and a capacitance 74, and also a driver circuit 76 in the form of a demodulator. This demodulator 76 serves to demodulate received data signals, and also to process them. The inductance 72 and the capacitance 74 form a parallel resonant circuit which is connected to the demodulator 76. The coupling electrode 62 of the sensor unit 60 is furthermore connected at the connection point 78 between the inductance 72, the capacitance 74 and the demodulator 76. The ground electrode 64 of the sensor unit 60 is connected at the other connection point 80 between the inductance 72, the capacitance 74 and the demodulator 76.

The precise coupling of the ground electrode 14 of the base station 10, the coupling electrode 12 of the base station 10, the coupling electrode 62 of the sensor unit 60 and the ground electrode 64 of the sensor unit 60 via the capacitive connection 50 and also via the electrical, that is to say ohmic or likewise capacitive, connections 52 (=assigned to the base station 10) and 54 (=assigned to the sensor unit 60) are explained below with reference to FIG. 3.

In the real system of the first example of embodiment according to FIG. 3, there is an electric field between the coupling electrode 12 of the base station 10, which is designed as the transmitter electrode, and the steel reinforcement of the outer case 92 of the wheel or tire 90 and also between this steel reinforcement and the coupling electrode 62 of the sensor unit 60, which is designed as the receiver electrode. The electrical circuit is connected via the electrically or likewise capacitively coupled connection between the electronics of the base station 10 and the electronics of the sensor unit 60 (metallic parts between wheel guard 40 and rim 94 of the wheel or tire 90, where the wheel guard 40 and the rim 94 are optionally electrically connected to one another).

In this case, the coupling between the vehicle-side base station 10 and the sensor 60 located in the tire (cf. FIG. 3) or on the wheel (cf. FIG. 4) can be seen, for example, in detail below:

The capacitive transmitter 10 is electrically connected at one pole to the transmitter electrode 12 in the wheel guard 40. This transmitter electrode 12 capacitively couples to the steel reinforcement in the wheel or tire 90. This in turn is electrically or likewise capacitively connected to a receiver electrode 62 of the sensor 60. In the sensor 60 there is an electrical connection to the second sensor electrode 64.

This second sensor electrode 64 in turn is electrically or likewise capacitively connected to the rim 94. The rim 94 is electrically (via the wheel bearing) or capacitively connected to the vehicle chassis. The vehicle chassis in turn is electrically connected to the second pole of the base station. There is thus a closed electrical circuit which is carried partly via conductive currents and partly via capacitive displacement currents.

With respect to the practical arrangement of the electronic communication system 100 outlined above by way of example, it seems particularly noteworthy that the function of this capacitive communication system 100 is still provided even when the transmitter electrode 12 in the wheel guard 40 is around two meters away from the steel reinforcement of the wheel or tire 90; in view of the fact that this distance is in practice only around twenty centimeters, the capability of the proposed principle is also not least documented by the fact that ten times the electrode distance (from twenty centimeters to two meters) leads to a reduction in the available electric field by around a factor of 100, since this electric field strength decreases by the square of the electrode distance.

Using this capacitive connection 50, it is now possible for example to wake up the sensor electronics of a specific wheel or tire 90 via a freely selectable protocol, and thus to trigger a measurement operation. The transmission return channel from the sensor unit 60 to the base station 10 can likewise be designed in a capacitive manner or else use any other transmission channel; in the latter case, for instance, a unidirectional capacitive connection from the base station 10 to the sensor unit 60 can be effected using an U[ltra]H[igh]F[requency] response of the wheel or tire parameter values, detected or determined by the sensor unit 60, to the base station 10.

The real system of the second example of embodiment for a capacitive communication system 100' according to FIG. 4 relates in particular to the constructive arrangement of the wheel or tire electrode, that is to say the coupling electrode 62 of the carrier station 60, for effecting capacitive communication between the base station 10 and the wheel sensor or sensors, that is to say the sensor station 60.

Accordingly, the second example of embodiment according to FIG. 4 differs from the first example of embodiment according to FIG. 3 above all in that the coupling electrode 62 of the sensor unit 60 is located on rather than in the wheel or tire 90.

One reason for this variation with respect to the first example of embodiment according to FIG. 3 is, inter alia, that framework conditions can be defined in which the steel belt of modern tires 90 is in some circumstances partially replaced by electrically non-conductive reinforcements and/or is not closed, so that such a steel belt can in some circumstances not always be used as an "auxiliary electrode".

For practical reasons (for example simple mounting and effective servicing) and/or for reasons of cost, too, it may prove to be advantageous for the coupling electrode 62 (what is referred to as the "receiver electrode") and the carrier station 60 (what is referred to as the sensor unit or "tag") where possible to be combined in a single module, as shown in the second example of embodiment according to FIG. 4.

In order, in this connection, to take other considerations and laboratory studies into account, in the second example of embodiment according to FIG. 4 the coupling electrode 62 is fused to the valve 96 of the wheel or tire 90, that is to say that the coupling electrode 62 is mechanically integrated in the valve body 96 of the wheel or tire 90.

As shown in the electrical circuit diagram in FIG. 2 and also in the first example of embodiment according to FIG. 3, the coupling electrode 62 is electrically or capacitively connected to the electronics of the sensor unit 60. Furthermore, this capacitive coupling electrode 62 is electrically insulated with respect to the wheel rim, that is to say with respect to ground.

The sensor unit 60 is connected to the wheel rim, that is to say to ground, by means of its second terminal, that is to say electrically by means of its ground electrode 64 or capacitively in FIG. 4, as shown in the electrical circuit diagram of FIG. 2 and in the first example of embodiment according to FIG. 3.

The second example of embodiment according to FIG. 4 has a number of advantages, for instance, among other things, the combining of the coupling electrode 62 (what is referred to as the "receiver electrode") and the carrier station 60 (what is referred to as the sensor unit or "tag") in a single module, which makes mounting and servicing considerably easier.

Furthermore, in the second example of embodiment according to FIG. 4, simple mechanical integration of the coupling electrode 62 into the existing valve 96 is also possible, where the disclosed embodiment can be used both with steel breaker tires and with metal-free tires. Possibilities for making the electrodes 62, 64 in a cost-effective manner make the method beneficial for use in mass production.

Where in the text above corresponding explanations in relation to the second example of embodiment of the capacitive communication system 100' according to FIG. 4 have not been given, reference is made to the corresponding explanations in relation to the first example of embodiment of the electronic communication system 100 according to FIG. 3, for the purpose of avoiding unnecessary repetitions in relation to the arrangements, elements, features and/or advantages of the second example of embodiment according to FIG. 4; these arrangements, elements, features and/or advantages of the first example of embodiment according to FIG. 3 are—unless indicated otherwise in the second example of embodiment according to FIG. 4—expressly given in relation to the subject of the explanations regarding the second example of embodiment of the electronic communication system 100' according to FIG. 4.

Finally, with respect to the two examples of embodiment of the present invention shown in FIGS. 2 to 4, it should be pointed out that these two examples of embodiment according to the invention also allow a bidirectional capacitive connection with bidirectional capacitive data transmission, for instance by both the driver circuit 26 assigned to the base station 10 and the driver circuit 76 assigned to the sensor unit 60 being designed in each case as a combined modulator/demodulator unit.

If the capacitive communication is bidirectional, the coupling electrode 62 can accordingly be designed as the receiver electrode and/or as the transmitter electrode.

LIST OF REFERENCES 100 electronic communication system (first example of embodiment according to FIG. 3)
100' electronic communication system (second example of embodiment according to FIG. 4)
10 base station
12 coupling electrode of the base station 10
14 ground electrode of the base station 10
20 processing circuit of the base station 10
22 inductance of the processing circuit 20
24 capacitance of the processing circuit 20
26 driver circuit, in particular modulator, of the processing circuit 20
28 connection point between inductance 22 and capacitance 24
30 connection point between capacitance 24 and driver circuit 26
32 Screen of the inductance 22
40 wheel guard
50 first coupling path between base station 10 and sensor unit 60, in particular coupling capacitor formed by coupling electrode 12 of the base station 10 and by coupling electrode 62 of the sensor unit 60
52 second coupling path between base station 10 and sensor unit 60, in particular coupling capacitor formed by ground electrode 14 of the base station 10 and by ground potential
54 third coupling path between base station 10 and sensor unit 60, in particular coupling capacitor formed by ground electrode 64 of the sensor unit 60 and by ground potential
60 carrier station =sensor unit
62 coupling electrode of the sensor unit 60
64 ground electrode of the sensor unit 60
70 processing circuit of the sensor unit 60
72 inductance of the processing circuit 70

74 capacitance of the processing circuit 70
76 driver circuit, in particular demodulator, of the processing circuit 70
78 first connection point between inductance 72, capacitance 74 and driver circuit 76
80 second connection point between inductance 72, capacitance 74 and driver circuit 76
90 wheel or tire
92 outer case of the wheel or tire 90
94 rim of the wheel or tire 90
96 valve of the wheel or tire 90

The invention claimed is:

1. An electronic communication system for a progressive movement means, having
    at least one base station arranged in the progressive movement means and
    at least one carrier station, in particular a movable carrier station, that is designed to exchange data signals with the base station,
    where the base station has
        at least one coupling electrode,
        at least one ground electrode and
        at least one processing circuit for transmitting and/or receiving the data signals, formed by a voltage between the coupling electrode and the ground electrode, between the carrier station and
    where the carrier station has
        at least one coupling electrode,
        at least one ground electrode and
        at least one processing circuit for receiving and transmitting the data signals, formed by a voltage between the coupling electrode and the ground electrode, between the base station,
    where the coupling electrode of the base station and the coupling electrode of the carrier station are coupled to one another during operation via a coupling path for the transmission of the data signals, which coupling path has at least one capacitive connection provided over at least one electric field,
    where the ground electrode of the base station is connected electrically or capacitively during operation to an electrical ground body of the progressive movement means and
    where the ground electrode of the carrier station is connected electrically or capacitively during operation to the electrical ground body of the progressive movement means, characterized in that the carrier station is designed as in each case at least one sensor unit,
    which is assigned to at least one wheel or tire of the progressive movement means and
    which is designed to detect and/or determine at least one characteristic parameter of the wheel or tire.

2. A communication system as claimed in claim 1, characterized in that the carrier station,
    is spatially assigned to the outer case or the valve of the wheel or tire of the progressive movement means and
    is electrically insulated from the rim of the wheel or tire of the progressive movement means.

3. A communication system as claimed in claim 2, characterized in that the carrier station and/or the coupling electrode are integrated in the valve of the wheel or tire.

4. A communication system as claimed in claim 1, characterized in that the carrier station and the coupling electrode are designed as a single component and/or as a one-piece module.

5. A communication system as claimed in claim 1, characterized in that the coupling electrode of the base station
    is spatially assigned to the wheel guard of the progressive movement means and
    is electrically insulated from the wheel guard.

6. A communication system as claimed in claim 1, characterized in that the processing circuit of the base station has
    at least one inductance,
    at least one capacitance and
    at least one driver circuit in the form of at least one modulator, which are preferably connected to one another in series,
    where the coupling electrode of the base station is preferably connected at the connection point between the inductance and the capacitance and/or
    where the ground electrode of the base station is preferably connected at the connection point between the capacitance and the driver circuit.

7. A communication system as claimed in claim 1, characterized in that the processing circuit of the carrier station has
    at least one inductance and
    at least one capacitance,
which are preferably connected to one another in parallel as a resonant circuit, and also
    at least one driver circuit in the form of at least one demodulator,
    where the coupling electrode of the carrier station is preferably connected at the connection point between the inductance, the capacitance and the driver circuit and/or
    where the ground electrode of the carrier station is preferably connected at the other connection point between the inductance, the capacitance and the driver circuit.

8. A base station for an electronic communication system as claimed in claim 1.

9. A sensor unit for an electronic communication system as claimed in claim 1.

10. The use of at least one electronic communication system as claimed in claim 9, for detecting and/or determining at least one characteristic parameter.

\* \* \* \* \*